United States Patent [19]

Tucci

[11] Patent Number: 4,512,836
[45] Date of Patent: Apr. 23, 1985

[54] METHOD OF PRODUCING COMPOSITE STRUCTURAL MEMBERS

[75] Inventor: Allan T. Tucci, Orange, Calif.

[73] Assignee: McDonnell Douglas Corporation, Long Beach, Calif.

[21] Appl. No.: 525,105

[22] Filed: Aug. 22, 1983

[51] Int. Cl.³ .................... B29D 3/02; B29G 1/00; B29C 17/14
[52] U.S. Cl. .................... 156/174; 156/245; 156/289; 264/137; 264/163; 264/258
[58] Field of Search ............... 264/137, 257, 258, 163; 156/174, 289, 245

[56] References Cited

U.S. PATENT DOCUMENTS

| | | | |
|---|---|---|---|
| 2,726,185 | 12/1955 | Howald | 156/174 |
| 2,906,656 | 9/1959 | Case | 156/174 |
| 3,104,191 | 9/1963 | Hicks et al. | 156/174 |
| 3,414,453 | 12/1968 | Carter | 156/174 |
| 3,873,291 | 3/1975 | Miller | 156/174 |
| 4,022,864 | 5/1977 | Medler | 264/257 |
| 4,330,349 | 5/1982 | Swift et al. | 156/174 |

FOREIGN PATENT DOCUMENTS

| | | | |
|---|---|---|---|
| 555316 | 4/1958 | Canada | 156/174 |
| 2460808 | 1/1976 | Fed. Rep. of Germany | 156/174 |

*Primary Examiner*—Willard E. Hoag
*Attorney, Agent, or Firm*—John P. Scholl; George W. Finch; Donald L. Royer

[57] ABSTRACT

The inventive method is used to make 3-Dimensional reinforced and flanged parts from filaments which are braided or wound flat (parallel to the surface of a mandrel).

The method comprises the steps of:
  depositing a first layer of impregnated reinforcements on a mandrel parallel to the surface of the mandrel;
  placing separators on a portion of said first layer;
  depositing a second layer of impregnated reinforcements over the separators and said first layer;
  cutting said layers at the separators;
  removing said layers from the mandrel;
  parting the layers along said separators;
  removing said separators from said reinforcements;
  placing said cut and partially separated layers in a mold;
  conforming the layers to the shape of the mold;
  curing said impregnated reinforcements into a composite part; and
  removing said composite part from said mold.

3 Claims, 6 Drawing Figures

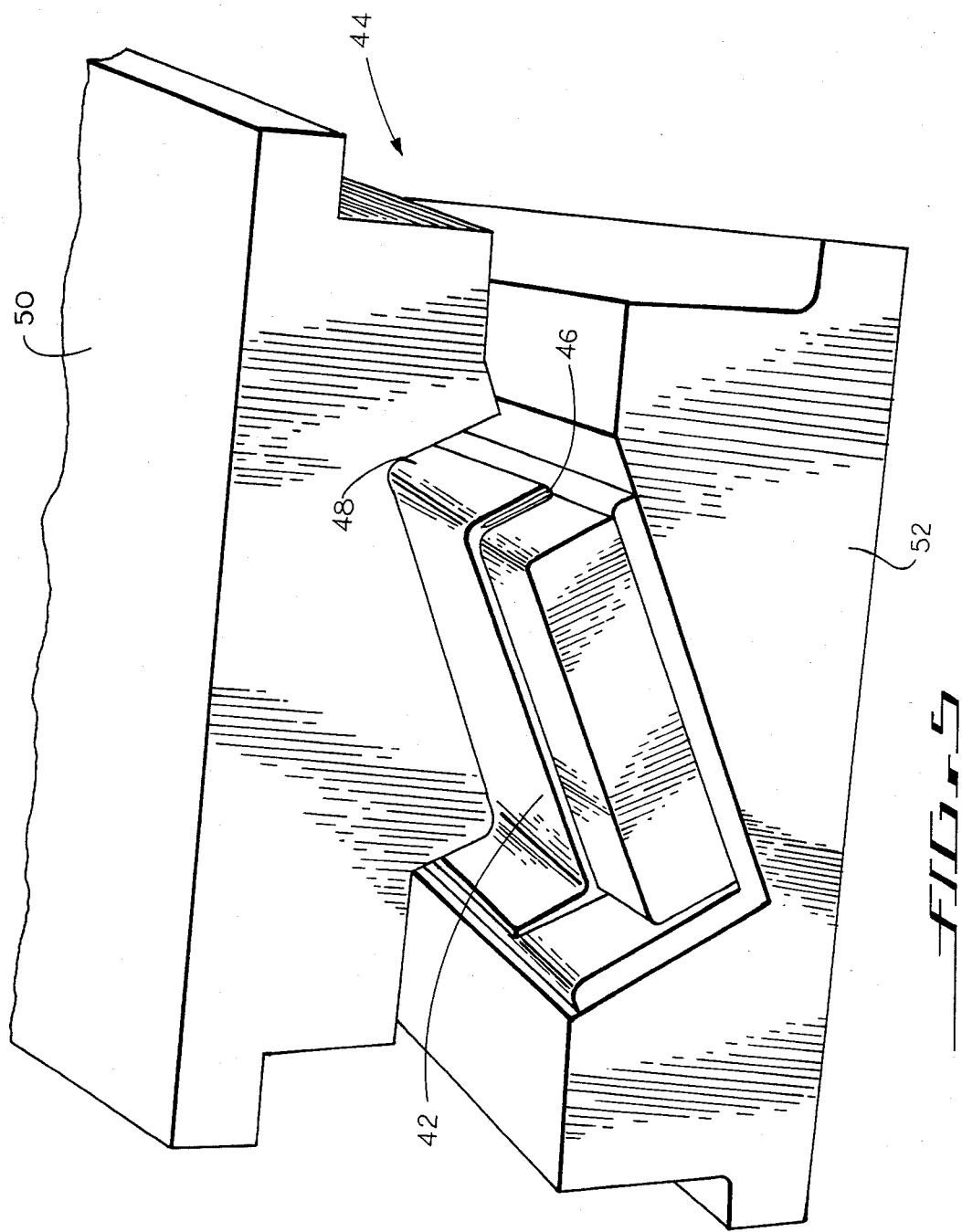

METHOD OF PRODUCING COMPOSITE STRUCTURAL MEMBERS

BACKGROUND OF THE INVENTION

In the prior art, 3-Dimensional structures have been fabricated by braiding or winding of impregnated reinforcement members (fibers, tapes or filaments) on a mandrel, removing said fibers from said mandrel and placing the resulting tubes of wound fibers into a mold and curing the resin or other matrix material into a composite part.

Difficulty has been experienced in removing the tubes of fibers from the mandrel. This removal was usually accomplished by collapsing the mandrel and sliding off the tube of wound fibers. These tube structures could then be formed into "C" shaped beams. When "I" or "J" beams were required, a separate fabrication was necessary to produce the edge flange or angled portions of the structures.

It would be desirable if the wound fibers could be easily removed from the mandrel, and the layers of fibers parted for later insertion of additional fiber stiffners as desired. Further, to achieve greater structural integrity and continuity of fibers as well as ease of fabrication of the layers, the fibers should be deposited on a single mandrel and the fibers should run through the entire composite structure with the least possible discontinuity.

BRIEF DESCRIPTION OF THE PREFERRED EMBODIMENT

Impregnated reinforcement members are layered on a mandrel by winding or braiding at angles within the preferred range of plus or minus 5° to plus or minus 85°. When the desired thickness of a first layer has been deposited (layered) on the mandrel, separators in the form of release film or metal shims or strips are laid on a portion of the first layer in a desired pattern depending upon the edge structure of the 3-Dimensional part. A second layer of impregnated reinforcements is then wound or braided over the first layer as well as over the separators. The uncured impregnated layered composite is then cut from the mandrel. The desired cuts will be at the separators and individual parts may be peeled away and removed from the mandrel. The layers are then parted and the separators are then removed from the layered structure. As an alternative, the entire layered structure may be removed from the mandrel by making a single longitudinal cut parallel to the axis of rotation of the mandrel and removing the layered structure together with the separators. The layered composite may then be cut in any shape to form the desired parts. Once the uncured composite part is cut from the mandrel it is parted at the separators, the separators removed, stiffners inserted where necessary and end caps added if desired. The composite is then placed in a mold and formed to the shape of the mold. Curing is according to conventional methods, times and temperature cycles. The finished part is then removed from the mold and trimmed as necessary.

The layered composite is easily removed from the mandrel by cutting through the layer at the separators. A solid mandrel may be used with this method because the mandrel does not have to be collapsed for removal of the layered composite. By locating the cuts at the separators, the separators may be easily removed from the layered composite. By utilization of the separators, additional plies of impregnated stiffners may be placed between the two layers to enhance the strength of the resultant part. Further, additional plies of impregnated stiffners may be added as end caps to the ends or edges of the part to strengthen "I" or "J" flanges of beams. These additional plies are cured with the layered composite in the mold.

Irregular-shaped parts may be fabricated by this same method utilizing separators where it is desired to add stiffners or have a flanged edge on the part.

DESCRIPTION OF THE DRAWINGS

FIG. 5 is a perspective view of the end of an open mold used to form a "J" beam. Additional plies of impregnated reinforcement members have been inserted between the layers on one edge to increase the strength of this portion of the flange of the "J" beam;

DESCRIPTION OF THE PREFERRED EMBODIMENT

Figure 1:
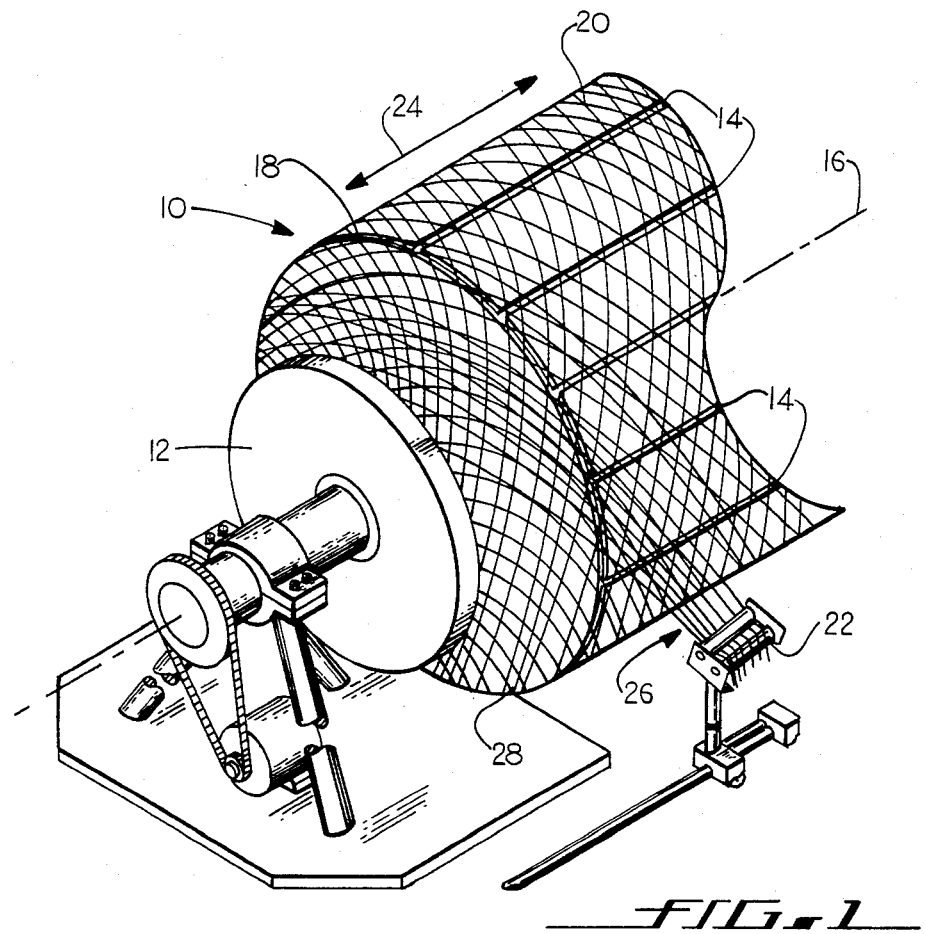
FIG. 1 is a perspective view of a portion of a mandrel, with a first layer of filaments wound on the mandrel.

A portion of a winding machine 10 with a rotating solid mandrel 12 is shown in FIG. 1. The mandrel has narrow shallow longitudinal grooves 14 on its surface running lengthwise parallel to the axis of rotation 16 of the mandrel 12. The mandrel also has narrow shallow circumferential grooves 18 at its ends. These narrow shallow grooves facilitate the cutting and removal of the layered structure.

A first layer 20 of resin impregnated graphite fibers are wound onto the mandrel by conventional winding apparatus by having the winding loom bander 22 make two passes along the length of the mandrel 12 parallel to the axis of rotation 16 of the mandrel as indicated by the double-ended arrow 24. The fibers are laid down parallel to the surface of the mandrel at a plus and minus 10° angle to the axis of rotation of the mandrel 16. Fibers may be laid down within the range of plus or minus 5° to plus or minus 85°. The impregnated fibers 26 (reinforcements or stiffners) are tacky as a result of being impregnated with the matrix material and are closely spaced on the mandrel such that the wound layer 20 consisting of two passes of fibers is substantially set and may be manipulated and formed even though the epoxy matrix material has not been cured.

Double-backed tape (not shown) may be wrapped on the dome ends 28 of small diameter mandrels if necessary to hold the fibers in a fixed relationship. This dome end portion of the fibers is selvage and eventually is cut away from the useful material and disposed of as waste.

When winding is the method of depositing (layering) the fibers onto the mandrel, at least two passes, up and back the length of the mandrel, are necessary to construct a substantially set layer which may be cut from the mandrel and later formed in a curing die. If braiding is used, a single pass along the mandrel 12 may be sufficient to form a set layer if the fibers are closely spaced and cross at the proper angles. Continuous filaments or tapes may be used as the reinforcement members (stiffners) in lieu of fibers or fillers. These reinforcement members may be made of fiberglass, Kelvar, carbon, graphite, or other high modulus fibers.

The matrix material may be thermoset resins or epoxies as well as a thermoplastic material such as poly ether ether ketone marketed under the Trademark PEEK by Imperial Chemical Industries located at Welwyn-Garden City, Hertfordshire, England AL7 1HD.

Figure 2:
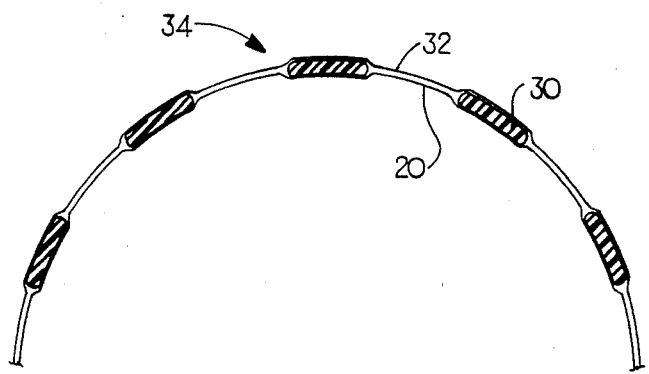
FIG. 2 is a portion of a cross-section of a layered composite (cut along a circumferential groove perpendicular to the axis of the mandrel) showing the relationship of the layers of the reinforcements or stiffners and the separators.

Once the desired first layer has been wound on the mandrel, separators 30, FIG. 2, are placed on the first layer where it is desired to part the first layer from any subsequent deposited layer. These separators 30 may be in the form of a strip of release film of Armalon or FEP Teflon marketed by Dupont Co. of Wilmington, Del., or in the alternative they may be metal shims or strips.

A second layer 32 of impregnated reinforcing fibers is then layered over the first layer 20 and over the separators 30. The layered structure 34 may then be cut at the separators using a slitter knife which follows the narrow longitudinal and circumferential grooves 14, 18 located in the mandrel 12. The layered structure 34 may also be cut and removed by other conventional means. Each part may be cut separately and peeled from the mandrel 12 or the entire layered structure 34 may be removed from the mandrel 12 by making a single longitudinal cut paralleling the axis of rotation 16 of the mandrel 12. If the entire layered structure is removed from the mandrel it may be cut if desired by a high pressure jet of water or by other conventional means.

These cut uncured composite parts containing the separators may be stored flat. If a suitable matrix material is used, the curing of the composite part may be delayed by refrigeration.

Figure 3:
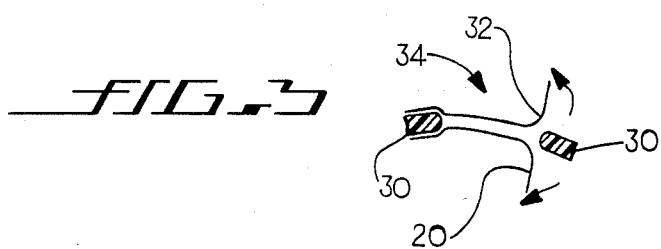
FIG. 3 is an end view of the uncured composite part showing the opening of the layers, removing the separator and bending of the layers to form the flange on the edge of the part.
Figure 4:
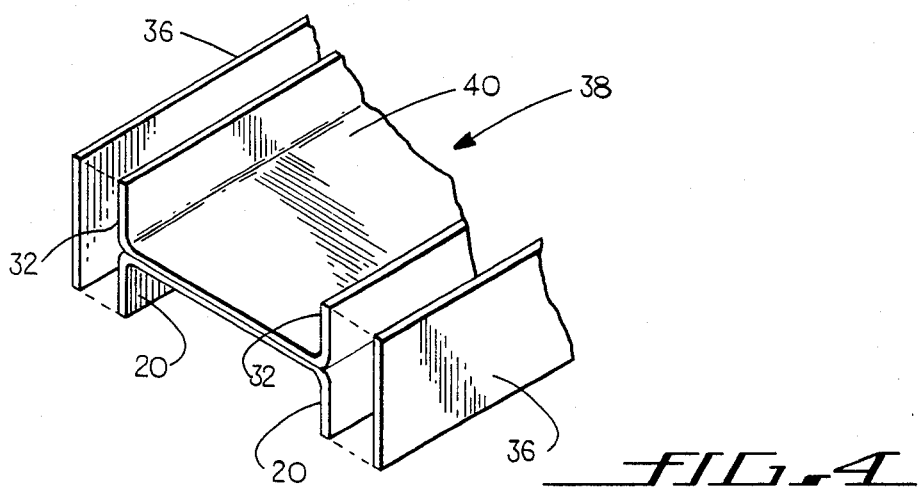
FIG. 4 dipicts a perspective view of the end of the "I" beam with reinforcing caps being placed on the flanged edges to enhance the strength of the edges.

When the layered part is to be fabricated, and the curing is to be completed, the first and second layers 20, 32 are parted, FIG. 3, and the separators 30 are removed. In FIG. 4, end caps 36 of impregnated fibers are placed on the edges to reinforce the flange portions of the "I" beam 38. The center web 40 is comprised of both the first layer 20 and the second layer 32.

In FIG. 5 a part, in this case a "J" beam 42, is placed in a mold and formed to the shape of the mold. Additional stiffners 46 may be inserted in the flange 48 of the "J" beam 42.

The mold 44 in FIG. 5 is in the open position with top 50 suspended above the bottom 52 to show the interior structure of the mold and "J" beam 42. When the "J" beam mold of FIG. 5 is closed and clamped up, the shape of the mold edges on the top (not shown) prevent the uncured epoxy or other matrix material from running from the mold. The mold may also contain depth gauges or pins (not shown) which limit the closure of the mold so that the uncured matrix material has the proper thickness and is not forced to one edge or another resulting in a part with non-uniform thickness. In FIG. 5, additional reinforcement plies 46 have been inserted in a space provided by the separator 30 on an edge 48 of the beam 42 to strengthen that flange. To accomplish the insertion, the layers 20, 32 of the uncured composite part have been separated along the edge and the stiffner 46 inserted. The layered structure is then placed in the mold 44 and the part 42 conformed to the shape of the mold. In the case where thermoset matrix is used the composite is cured by heat and pressure. In the instance where thermoplastic matrix is used the composite is cured by pressure forming and heat.

Figure 6:
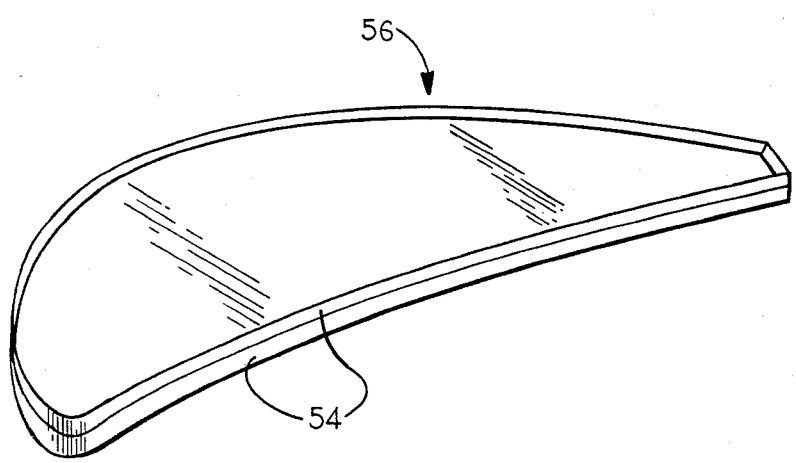
FIG. 6 shows an irregular shaped part with upstanding flanges along the edges.

The inventive method comprising the use of separators may also be used to add strengthening plies or create flanges 54 on irregular shaped parts 56 (FIG. 6.)

There has been shown and described a novel method of producing composite structural members which fulfills all the objects and advantages sought therefore. Many changes, modifications, variations and other uses and applications of the subject invention will, however, become apparent to those skilled in the art after considering this specification and the accompanying drawings. All such changes, modifications, alterations and other uses and applications which do not depart from the spirit and scope of the invention are deemed to be covered by the invention which is limited only by the claims which follow:

What is claimed is:

1. The method of fabrication of a 3-Dimensional part comprising the steps of:
    depositing a first layer of reinforcements impregnated with curable resin on a mandrel parallel to the surface of the mandrel;
    placing separators on a only portion of said first layer;
    depositing a second layer of reinforcements impregnated with curable resin over the separators and said first layer forming a layered structure;
    cutting said layered structure at the separators;
    removing said layers from the mandrel;
    parting the layers along said separators;
    removing said separators from said reinforcements;
    inserting a reinforcing material between the layers to replace the separators and to reinforce edges of said layers;
    placing said cut and partially separated layers in a mold;
    conforming the layered structure to the shape of the mold;
    curing said impregnated reinforcements into a composite part; and
    removing said composite 3-Deimensional part from and mold.

2. The method of claim 1 wherein additional stiffners are inserted between the layers following the removal of the separators.

3. The method of claim 1 wherein additional impregnated reinforcements are added to the separated layers.

* * * * *